United States Patent
Wang et al.

(10) Patent No.: US 12,307,789 B2
(45) Date of Patent: May 20, 2025

(54) MULTI-TASK JOINT PERCEPTION NETWORK MODEL AND DETECTION METHOD FOR TRAFFIC ROAD SURFACE INFORMATION

(71) Applicant: JIANGSU UNIVERSITY, Zhenjiang (CN)

(72) Inventors: Hai Wang, Zhenjiang (CN); Guirong Zhang, Zhenjiang (CN); Yingfeng Cai, Zhenjiang (CN); Long Chen, Zhenjiang (CN); Yicheng Li, Zhenjiang (CN); Qingchao Liu, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 18/575,391

(22) PCT Filed: May 6, 2023

(86) PCT No.: PCT/CN2023/092501
§ 371 (c)(1),
(2) Date: Dec. 29, 2023

(87) PCT Pub. No.: WO2024/138993
PCT Pub. Date: Jul. 4, 2024

(65) Prior Publication Data
US 2024/0420487 A1 Dec. 19, 2024

(30) Foreign Application Priority Data
Dec. 26, 2022 (CN) .......................... 202211675099.6

(51) Int. Cl.
*G06K 9/62* (2022.01)
*G06V 10/26* (2022.01)
(Continued)

(52) U.S. Cl.
CPC ............ *G06V 20/588* (2022.01); *G06V 10/26* (2022.01); *G06V 10/32* (2022.01);
(Continued)

(58) Field of Classification Search
None
See application file for complete search history.

(56) References Cited

U.S. PATENT DOCUMENTS 10,908,606 B2 * 2/2021 Stein ...................... B60W 40/06
11,410,549 B2 * 8/2022 Yang ........................ G06N 3/08
(Continued)

FOREIGN PATENT DOCUMENTS

CN 111882620 A 11/2020
CN 112418236 A 2/2021
(Continued)

OTHER PUBLICATIONS

Liu et al., "A Robust Lane Detection Model Using Vertical Spatial Features and Contextual Driving Information." Sensors (Basel). Jan. 21, 2021;21(3):708. doi: 10.3390/s21030708. (Year: 2021).*
(Continued)

*Primary Examiner* — Feng Niu
(74) *Attorney, Agent, or Firm* — Bayramoglu Law Offices LLC

(57) ABSTRACT

A multi-task joint perception network model and detection method for traffic road surface information can simultaneously detect a lane line and a drivable area. A coordinate attention mechanism is integrated into a traditional feature extraction network to ensure that a feature extraction effect is enhanced while a calculated amount is not increased. In a neck network, a dilated convolution residual module is proposed to enhance performance of prediction of details by the network, and a decoder part shares features of the drivable area into lane line detection to enhance a lane line (Continued)

detection effect under complex road conditions. In a training stage, there is provided a alternating optimization training method to improve integral segmentation performance of the model. The multi-task joint perception network model and detection method realizes quite high accuracy and excellent speed performance in a challenging BDD100K dataset.

13 Claims, 5 Drawing Sheets

(51) Int. Cl.
    *G06V 10/32*     (2022.01)
    *G06V 10/77*     (2022.01)
    *G06V 10/776*     (2022.01)
    *G06V 10/80*     (2022.01)
    *G06V 10/82*     (2022.01)
    *G06V 20/56*     (2022.01)

(52) U.S. Cl.
    CPC ........ *G06V 10/7715* (2022.01); *G06V 10/776* (2022.01); *G06V 10/806* (2022.01); *G06V 10/82* (2022.01)

(56) References Cited

U.S. PATENT DOCUMENTS

| | | | |
|---|---|---|---|
| 11,527,074 B1 | 12/2022 | Ren et al. | |
| 11,631,238 B1* | 4/2023 | Wang | G06V 10/82 382/157 |
| 11,927,457 B2* | 3/2024 | Van Der Merwe | G05D 1/0274 |
| 2021/0019562 A1* | 1/2021 | Yang | G06F 18/2137 |
| 2021/0158699 A1* | 5/2021 | Yang | G08G 1/0145 |
| 2021/0278851 A1* | 9/2021 | Van Der Merwe | G06V 10/764 |
| 2022/0108452 A1* | 4/2022 | Xiang | G06T 7/11 |
| 2022/0392202 A1* | 12/2022 | Liu | G06V 10/7715 |
| 2023/0014874 A1* | 1/2023 | Shen | G06V 20/56 |
| 2023/0144209 A1* | 5/2023 | Cai | G06T 5/20 348/148 |
| 2023/0237666 A1* | 7/2023 | Gao | G06V 10/44 |
| 2023/0419646 A1* | 12/2023 | Han | G06N 3/0442 |
| 2024/0193923 A1* | 6/2024 | Wang | G06V 10/454 |

FOREIGN PATENT DOCUMENTS

| | | | | |
|---|---|---|---|---|
| CN | 112418236 B | * | 10/2022 | ......... G06K 9/00798 |
| CN | 115223130 A | | 10/2022 | |
| CN | 115482518 A | | 12/2022 | |
| CN | 115223130 B | * | 2/2023 | ............. G06V 10/20 |
| CN | 115797881 A | | 3/2023 | |
| WO | 2021110166 A1 | | 6/2021 | |
| WO | 2022237139 A1 | | 11/2022 | |
| WO | WO-2024060605 A1 | * | 3/2024 | ............. G06V 10/20 |

OTHER PUBLICATIONS

Khan et al., "LLDNet: A Lightweight Lane Detection Approach for Autonomous Cars Using Deep Learning." Sensors (Basel). Jul. 26, 2022;22(15):5595. doi: 10.3390/s22155595. (Year: 2022).*
Mahasin et al., "Comparison of CSPDarkNet53, CSPResNext-50, and EfficientNet-B0 backbones on YOLO v4 as object detector." International journal of engineering, science and information technology 2, No. 3 (2022): 64-72. (Year: 2022).*
Woo et al., "Cbam: Convolutional block attention module." In Proceedings of the European conference on computer vision (ECCV), pp. 3-19. 2018. (Year: 2018).*
Liu et al., "Lane detection in complex scenes based on end-to-end neural network," 2020 Chinese Automation Congress (CAC), Shanghai, China, 2020, pp. 4300-4305, doi: 10.1109/CAC51589.2020.9327660. (Year: 2020).*
Yu et al., "Unitbox: An advanced object detection network." In Proceedings of the 24th ACM international conference on Multimedia, pp. 516-520. 2016. (Year: 2016).*
Menon et al., "Long-tail learning via logit adjustment." arXiv preprint arXiv:2007.07314 (2020). (Year: 2020).*
Hussain et al., "Image Segmentation for Autonomous Driving Using U-Net Inception," 2022 7th International Conference on Signal and Image Processing (ICSIP), Suzhou, China, 2022, pp. 426-429 (Year: 2022).*
Zhao et al., "End-to-End Retinex-Based Illumination Attention Low-Light Enhancement Network for Autonomous Driving at Night." Computational Intelligence and Neuroscience 2022, No. 1 (2022): 4942420. (Year: 2022).*
Shi et al., "A Review of Lane Detection Based on Semantic Segmentation." International Journal of Advanced Network, Monitoring and Controls 6, No. 3 (2021): 1-8. (Year: 2021).*
Cheng et al., "SE3: Sequential Semantic Segmentation of Large Images with Minimized Memory," 2022 26th International Conference on Pattern Recognition (ICPR), Montreal, QC, Canada, 2022, pp. 3443-3449 (Year: 2022).*
Chen et al., "CenterPNets: A Multi-Task Shared Network for Traffic Perception." Sensors (Basel). Feb. 23, 2023;23(5):2467. doi: 10.3390/s23052467. PMID: 36904671; PMCID: PMC10007440. (Year: 2023).*
CN 115223130 B (machine translation) (Year: 2023).*
CN 112418236 B (machine translation) (Year: 2022).*

* cited by examiner (a) d = 1

(b) d = 3

MULTI-TASK JOINT PERCEPTION NETWORK MODEL AND DETECTION METHOD FOR TRAFFIC ROAD SURFACE INFORMATION

CROSS REFERENCE TO THE RELATED APPLICATIONS

This application is the national phase entry of International Application No. PCT/CN2023/092501, filed on May 6, 2023, which is based upon and claims priority to Chinese Patent Application No. 202211675099.6, filed on Dec. 26, 2022, the entire contents of which are incorporated herein by reference.

TECHNICAL FIELD

The present disclosure pertains to the technical field of intelligent self-driving automobile environment perception, and particularly relates to a multi-task detection method for traffic road surface information.

BACKGROUND

Information required to be extracted by an environment perception system of an intelligent automobile includes dynamic and static obstacles and a road surface environment. The dynamic and static obstacles mainly refer to other vehicles, pedestrians, and dynamic or static objects on the ground which may influence safe driving of the vehicle around the vehicle; the road surface environment mainly refers to information of a geographic environment and road traffic around the vehicle, such as lane lines, road boundary lines, or the like, and for an unstructured road, road environment perception can be simplified into detection of a drivable area. In the self-driving perception system, detection of the two kinds of traffic road surface information of the lane lines and the drivable area is crucial.

Currently, most network models process self-driving perception tasks individually. There exist many deep learning-based solutions for the lane line detection task, and there are three main CNN-based lane line detection methods: a segmentation-based method, an anchoring-based method, and a curve fitting-based method. The segmentation-based method includes a classical SCNN in which messages are transferred between row and column pixels using layer-by-layer convolution and SAD-Enet in which context information is aggregated using a self-attention distillation module; the anchoring-based method includes LaneATT in which a new anchor-based attention mechanism is proposed to aggregate global information and UFLD in which an ultra-high lane line detection speed is realized using a row anchor-based method, UFLD is also the first method in which row classification is proposed, and although row classification guarantees the detection speed, a detection effect is not good, and particularly, the problem that detection cannot be performed when the vehicle changes lanes may occur; in the curve fitting-based method, different from pure point regression, a lane line curve is modeled using parameters, these parameters are regressed, a classical network for this method includes PolyLaneNet, but lane line deformation may occur during prediction of a high-order coefficient error in the curve fitting-based method.

The drivable area detection task is mostly processed using a semantic segmentation method, a pixel level result may be obtained for the drivable area detection task using the semantic segmentation method, and a full convolution network (FCN) is introduced into the semantic segment field; that is, image level classification is further extended to pixel level classification, but since a relationship between pixels and pixel time is not considered fully, this network lacks spatial consistency. In SegNet, non-linear upsampling of a corresponding encoder is computed during maximum pooling of a decoder, thus eliminating a learning process of upsampling. In PSPNet, features of four different pyramid sizes are fused to form a module containing information of different scales among different sub-areas, such that a context relationship can be fully utilized. SNE-RoadSeg is a road drivable area segmentation method based on surface normal vector extraction, this network is similar to encoding and decoding of U-Net (U-Net proves that use of skip connection is favorable for improving resolution of a whole space), a module of a surface normal estimator (SNE) is integrated in an upsampling part, and this method has an excellent performance in free space detection.

Although the single task processing solution achieves a good detection effect, time consumed by single-task continuous processing is certainly longer than time consumed by processing plural tasks together, and a delay and limited computing resources are always required to be considered during deployment on an embedded device.

SUMMARY

In order to solve the problem, the present disclosure provides a multi-task joint perception network model RSI-Net for road surface information, which can be configured to simultaneously process a lane line detection task and a drivable area segmentation task, as shown in FIG. 2. The network model includes a data preprocessing module, a Focus slicing module, a backbone network feature extraction module, a feature fusion module, a dilated convolution residual module, a lane line detection branch module, a drivable area segmentation branch module, and a feature sharing module.

Firstly, an input two-dimensional image is preprocessed using the data preprocessing module, and a luminosity and a geometric shape of the image are changed through data enhancement in a preprocessing process, by specific operations of adjusting a tone and saturation of the image and randomly rotating, zooming, translating, cutting, and overturning the image, to obtain an preprocessed image.

Then, the preprocessed image is sliced using the Focus slicing module to obtain a sliced image, where information of H and W dimensions in the preprocessed image is concentrated into a channel space, such that the preprocessed image becomes a double downsampled image without an information loss, and the sliced image is then transmitted into the backbone network feature extraction module.

Next, the image is downsampled three times using improved CSPDarkNet53 as the backbone network feature extraction module to extract more image features. CSPDarkNet53 originally has an excellent feature extraction capability, and can ensure that a computing loss of the whole model is reduced without a loss of detection precision. However, a lane line and a drivable area belong to depth targets, requiring the network model to capture more direction and position perception information, and therefore, in the present disclosure, a coordinate attention mechanism is integrated between a CBL module and a CSP module in CSPDarkNet53, such that a feature map convolved from the CBL module is aggregated into two independent direction perception feature mappings along a vertical direction and a horizontal direction respectively. The two feature mappings with embedded direction specific information are then encoded into two attention mappings respectively, and each of the attention mappings captures a long-distance dependency relationship of the input feature map along one spatial direction.

Then, feature information of the image obtained by a feature extraction network is input into the feature fusion module, i.e., a feature pyramid network (FPN), such that the information is further fused.

The dilated convolution residual module is designed behind the FPN, and for a condition that the network model according to the present disclosure is light and inevitably causes an insufficient receptive field of the model while an inference speed is guaranteed, the dilated convolution residual module is designed and added in the present disclosure to enhance the receptive field of the model, such that each convolution output contains information of a large range. Four layers of 3×3 convolution are adopted in the module and have dilated rates fitted incrementally to enhance a long-distance information linkage of the drivable area segmentation task and the lane line detection task.

A rear end of the dilated convolution residual module is provided with two decoders: the lane line detection branch module and the drivable area segmentation branch module, and the two decoders upsample the image features output from a neck network (i.e., the dilated convolution residual module) three times, such that the image is restored to an original size of 1280×720.

In the present disclosure, the feature sharing module is further designed between the two decoders, and is configured to perform an Add operation on a feature map obtained by first upsampling of the drivable area segmentation branch module and a feature map obtained by first upsampling of the lane line detection branch module, and then input a feature map obtained after the Add operation into the lane line detection branch module for second upsampling. Since the drivable area and the lane line are mutually blended targets, feature information of the drivable area segmentation branch module may be shared by the feature sharing module into a task of the lane line detection branch module, such that beneficial information is provided for lane line detection, thereby improving precision of the lane line detection.

In a whole network model training stage, a traditional end-to-end training manner is simplest, but wastes calculation and training time, and therefore, in order to compress the training time and optimize parameters, a brand-new alternating optimization algorithm is designed in the present disclosure to gradually train the model according to the present disclosure.

The present disclosure further provides a multi-task detection method for traffic road surface information, including:
S1: preprocessing an image, to obtain a preprocessed image;
S2: slicing the preprocessed image, to obtain a sliced image;
S3: performing feature extraction integrating a coordinate attention mechanism on the sliced image from the S2, to obtain extracted features;
S4: fusing the extracted features and enhancing a receptive field;
S5: performing drivable area segmentation and lane line detection on fused features, and upsampling receptive-field-enhanced features three times, to restore the image to an original size; and
S6: performing feature sharing on a feature map obtained in the S5: performing an Add operation on a feature map obtained by first upsampling during the drivable area segmentation and a feature map obtained by first upsampling during the lane line detection, and then inputting a feature map obtained after the Add operation into a lane line detection branch for second upsampling.

Further, the preprocessing of the S1 includes: adjusting sizes of the image and a label that are input, adjusting a tone and saturation of the image, randomly rotating, zooming, translating, cutting, and overturning the image, and performing normalization and boundary zero filling to obtain a three-channel digital image.

Further, the slicing of the S2 means that one value is obtained every other pixel in one image, similarly to neighboring downsampling, four images are obtained from one image, information of W and H dimensions is concentrated into a channel space, an input channel is expanded by a factor of three, and finally, a double downsampled image without an information loss is obtained.

Further, the feature extraction of the S3 includes: extracting image features using improved CSPDarkNet53, and downsampling the sliced image three times; the improved CSPDarkNet53 has an improvement in that the coordinate attention mechanism is integrated between a CBL module and a CSP module, the coordinate attention mechanism is an improvement made on a basis of two attention mechanisms: SE and CBAM, the coordinate attention mechanism means that two independent parallel 1D global pooling operations are used to aggregate input features into two separate direction perception feature mappings along a vertical direction and a horizontal direction respectively, the two feature mappings with embedded direction specific information are then encoded into two attention mappings respectively, each of the two attention mappings captures a long-distance dependency relationship of an input feature map along one spatial direction, position information is saved in the generated attention mappings with the above operation, and then, the two attention mappings are applied to a mapping of the input features by multiplication, to emphasize an interest representation.

Further, in the feature fusion of the S4, by adding dilated convolution residual modules at an end of a feature pyramid network, multi-scale feature information is fused, a dilated rate is introduced in a convolution process, a distance between points of a convolution kernel is controlled by setting a parameter value of the dilated rate, and when the dilated rate d is 1, dilated convolution of 3×3 is equivalent to standard convolution, and a single-layer receptive field only has a size of 3×3; when the dilated convolution d is 3, the single-layer receptive field is increased to 7×7; four layers of 3×3 convolution are adopted in the dilated convolution residual modules, the dilated rates of the four layers of convolution are fitted incrementally to enhance a long-distance information linkage of a drivable area segmentation task and a lane line detection task, and three dilated convolution residual modules are used to enhance the receptive field of a model, such that each convolution output contains information of a large range.

The present disclosure has the following advantages.
1) The present disclosure provides the multi-task joint perception network model RSI-Net concentrated on road surface information, which can be configured to simultaneously detect the lane line and the drivable area.
2) In the present disclosure, the coordinate attention mechanism is integrated into the traditional feature extraction network to ensure that a feature extraction effect is enhanced while a calculated amount is not increased.

3) In the neck network, the dilated convolution residual module is innovatively proposed in the present disclosure to enhance a performance of prediction of details by the network, and the decoder part shares the features of the drivable area into lane line detection to enhance a lane line detection effect under complex road conditions.

4) In the training stage, the present disclosure provides the novel alternating optimization training method to improve an integral segmentation performance of the model.

5) The model according to the present disclosure realizes quite high accuracy and an excellent speed performance in a challenging BDD100K dataset, mIoU of drivable area segmentation reaches 92.51%, lane line detection accuracy and IoU are 87.29% and 32.12% respectively, an overall inference speed reaches 39 FPS, and the detection effect is superior to a detection effect of a traditional single-task network model.

DETAILED DESCRIPTION OF THE EMBODIMENTS

The present disclosure provides a multi-task joint perception network model and detection method for traffic road surface information, which can simultaneously detect a lane line and a drivable area; a coordinate attention mechanism is integrated into a traditional feature extraction network to ensure that a feature extraction effect is enhanced while a calculated amount is not increased; in a neck network, a dilated convolution residual module is innovatively proposed in the present disclosure to enhance a performance of prediction of details by the network, and a decoder part shares features of the drivable area into lane line detection to enhance a lane line detection effect under complex road conditions. In a training stage, there is provided a novel alternating optimization training method to improve an integral segmentation performance of the model. The present disclosure realizes quite high accuracy and an excellent speed performance in a challenging BDD100K dataset, mIoU of drivable area segmentation reaches 92.51%, lane line detection accuracy and IoU are 87.29% and 32.12% respectively, an overall inference speed reaches 39 FPS, and a detection effect is superior to a detection effect of a traditional single-task network model.

The present disclosure is further described below with reference to the accompanying drawings.

Figure 1:
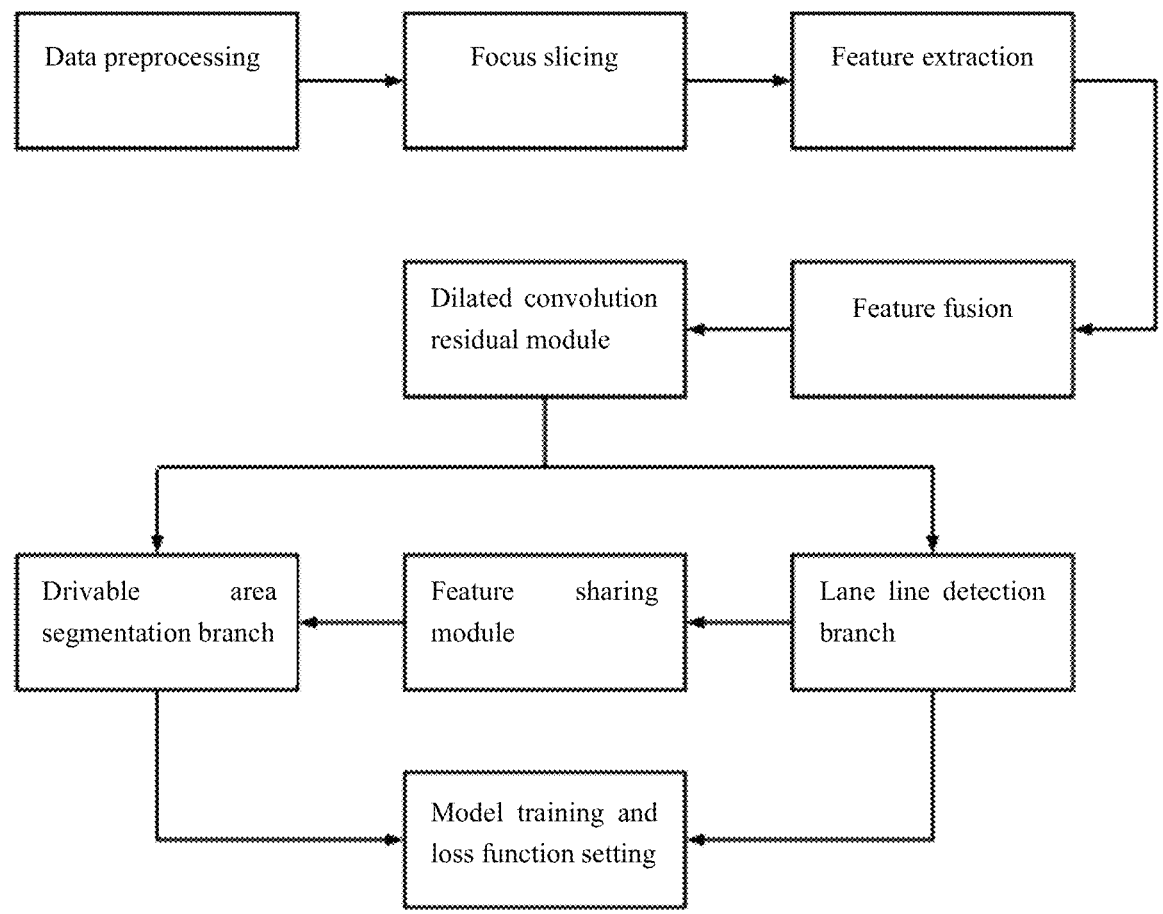
FIG. 1 is an implementation flow chart according to the present disclosure.
Figure 2:
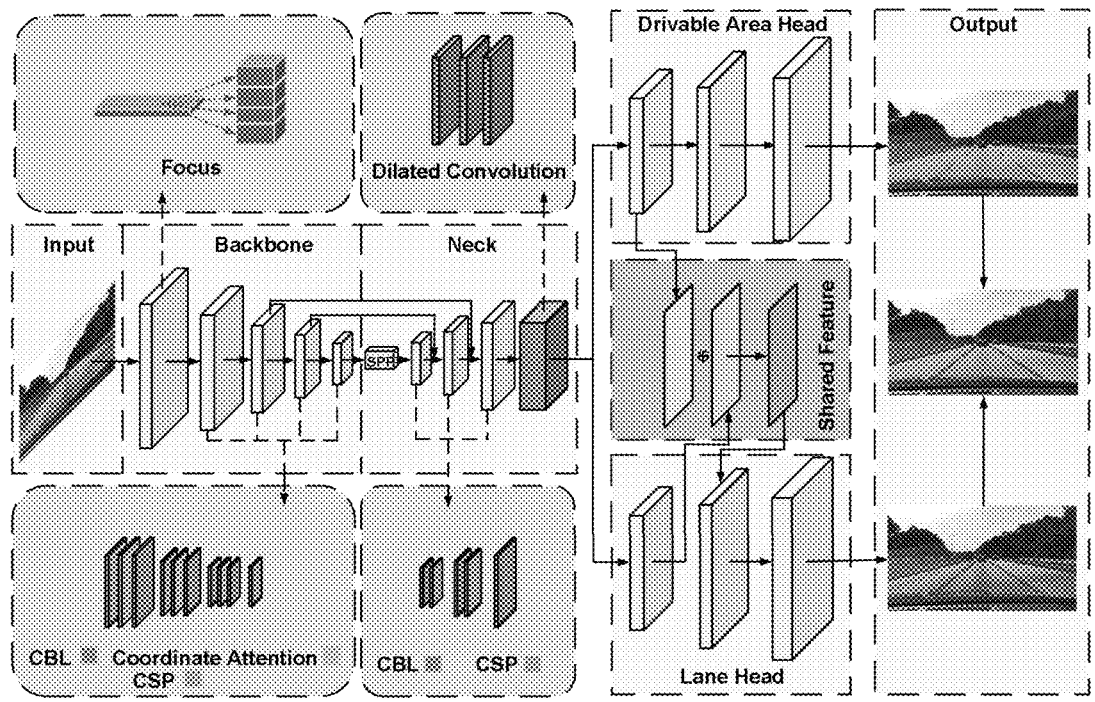
FIG. 2 is an overall framework diagram of RSI-Net.

As shown in FIGS. 1 and 2, an implementation of the present disclosure includes the following steps.

Step 1: data is preprocessed.

First, a labeled dataset (a BDD100K dataset) for model training is prepared. During model training, an image is preprocessed using the following method. (1) The dataset is loaded from a local file. (2) A label file is loaded from the local file. (3) Sizes of the image and a label that are input are adjusted. (4) A tone and saturation of the image are adjusted and the image is randomly rotated, zoomed, translated, cut, and overturned to enhance robustness of the model. (5) Normalization and boundary zero filling are performed to obtain a three-channel digital image.

Step 2: the image is sliced by a Focus slicing module.

Figure 3:
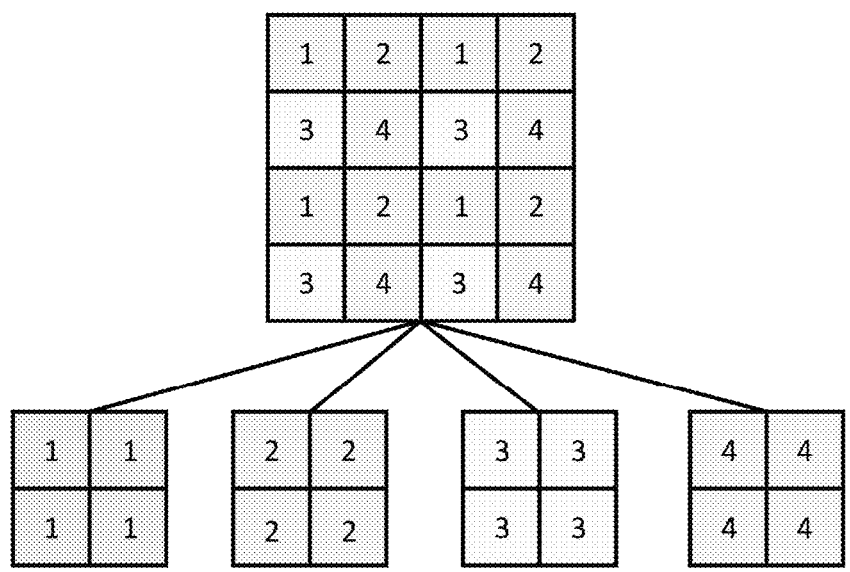
FIG. 3 is a schematic diagram of Focus slicing.

In the present disclosure, before feature extraction, the image is sliced using the Focus module, FIG. 3 shows a schematic diagram of the Focus slicing operation, this operation means that one value is obtained every other pixel in one image, which is similar to neighboring downsampling, four images are obtained from one image, information of W and H dimensions can be concentrated into a channel space, an input channel is expanded by a factor of three, and finally, a double downsampled image without an information loss can be obtained. The module has a main function of increasing a receptive field under a condition of ensuring that original information is not lost, and aims to reduce the calculated amount of the model and increase the inference speed of the model instead of improving precision of the network.

Step 3: feature extraction integrating the coordinate attention mechanism is performed.

In a backbone network, image features are extracted using improved CSPDarkNet53 in the present disclosure, and the sliced image is downsampled three times. Traditional CSPDarkNet53 shows an excellent feature extraction capability in YOLOv4, and advantages of using the network structure as the backbone network in the network model according to the present disclosure mainly include two aspects: firstly, a feature extraction capability of a convolution network is improved without losing detection precision, thereby increasing an overall detection speed of the model; and secondly, a calculation loss of the whole model is reduced, such that the model can also perform efficient learning and training on a CPU with a simple configuration.

Figure 4:
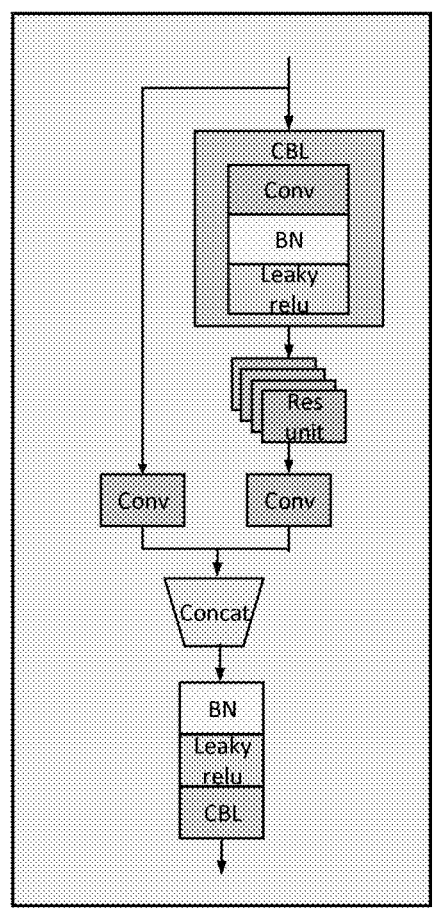
FIG. 4 is a configuration diagram of a CSP module.

CSPDarkNet53 mainly includes two modules: a CBL module and a CSP module, FIG. 4 shows a schematic structural diagram of the CSP module, the CBL module includes a convolutional layer, a standard regularization part and a Leaky_relu activation function, and in the CSP module, a feature mapping of a basic layer is divided into two parts firstly by using an idea of a CSPNet structure for example, and then, the two parts are combined by a cross-stage hierarchical structure, thereby reducing the calculated amount and guaranteeing high accuracy.

Figure 5:
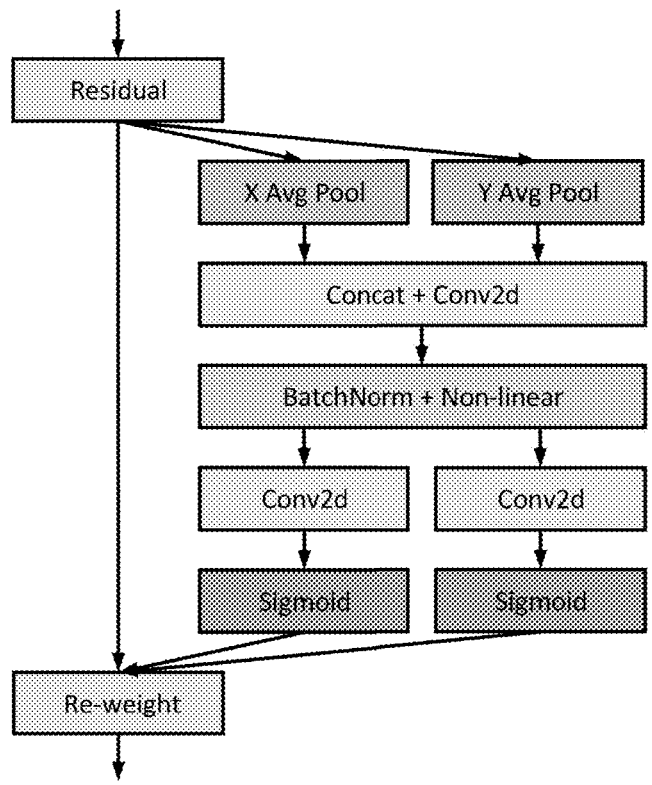
FIG. 5 is a structural diagram of a coordinate attention mechanism.

As the improvement of the traditional CSPDarkNet53 in the present disclosure, the coordinate attention mechanism is integrated between the CBL module and the CSP module, and FIG. 5 shows a two-dimensional structural diagram of the coordinate attention mechanism. The coordinate attention mechanism is an improvement made on the basis of two attention mechanisms: SE and CBAM. The SE attention mechanism only focuses on linkage among the channels, and ignores position information which is crucial to capturing a target structure in a visual task; in CBAM, a maximum value and an average value of a plurality of channels at each position are taken as weighting coefficients, such that only information of a local range is considered in the weighting, and thus, long range dependence information cannot be obtained. In the coordinate attention mechanism, in order to avoid a loss of the position information caused by 2D pooling, two independent parallel 1D global pooling operations are used to aggregate input features into two independent direction perception feature mappings along a vertical direction and a horizontal direction respectively, the two feature mappings with embedded direction specific information are then encoded into two attention mappings respectively, and each attention mapping captures a long-distance dependency relationship of the input feature map along one spatial direction. The position information can be saved in the generated attention mapping with the above operation, and then, the two attention mappings are applied to a mapping of the input features by multiplication, to emphasize an interest representation. With the method, cross-channel feature information can be acquired, and direction perception information and position perception information can be captured. Since the lane line and the drivable area belong to depth targets, integration of the coordinate attention mechanism in the feature extraction network facilitates the model to more precisely identify and position a lane line target on a road surface and improve an effect of segmentation of the drivable area.

Step 4: a neck network is designed for feature fusion.

A feature fusion module adopted for the neck network in the present disclosure is a classical feature pyramid network, and meanwhile, the dilated convolution residual module in the present disclosure is combined at an end of the neck network. Since the lane line belongs to a target with an elongated structure and the drivable area belongs to a spatial depth target, the network model according to the present disclosure is required to have high-level semantic features and local detail features, and therefore, the feature pyramid network is adopted in the present disclosure to fuse multi-scale feature information. For the CSP module in the neck network in the present disclosure, a plurality of original residual keys are replaced with a plurality of CBL modules, thereby reducing the calculated amount of the network model and enhancing the overall inference speed.

For a condition that the network designed in the present disclosure is light and inevitably causes an insufficient receptive field of the model while the inference speed is guaranteed, dilated convolution is designed and added in the present disclosure to enhance the receptive field of the model, such that each convolution output contains information of a large range. The dilated convolution means that a dilated rate is introduced in a convolution process, a distance between points of a convolution kernel is controlled by setting a parameter value of the dilated rate, and compared with common convolution, when a size of the convolution kernel is the same, a parameter quantity is unchanged, but the receptive field of the dilated convolution is larger, and the size of the receptive field of the single-layer dilated convolution follows the following formula:

$$k_d = k + (k-1)(d-1) \quad \#(1)$$

where k is a size of the receptive field of the original convolution kernel; $k_d$ is the size of the receptive field of the convolution kernel after dilation; d is the dilated rate.

Figure 6:
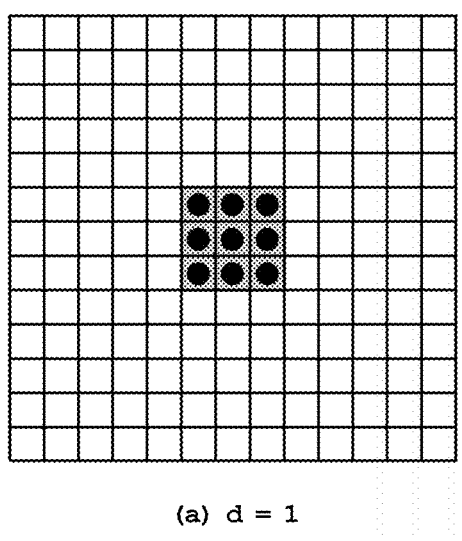
FIG. 6 is a schematic diagram of a receptive field at different dilated rates.
Figure 6:
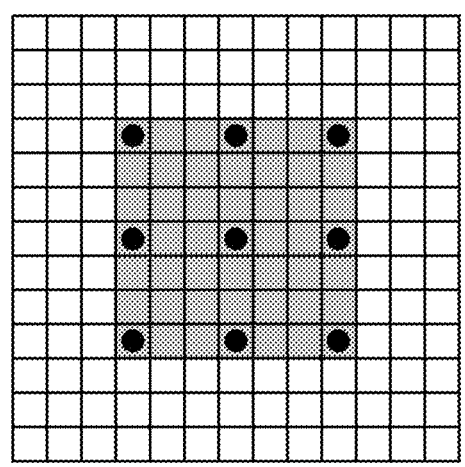

As shown in FIG. 6, when the dilated rate d is 1, the dilated convolution of 3×3 is equivalent to standard convolution, and the single-layer receptive field only has a size of 3×3; when the dilated convolution d is 3, the single-layer receptive field is increased to 7×7.

Figure 7:
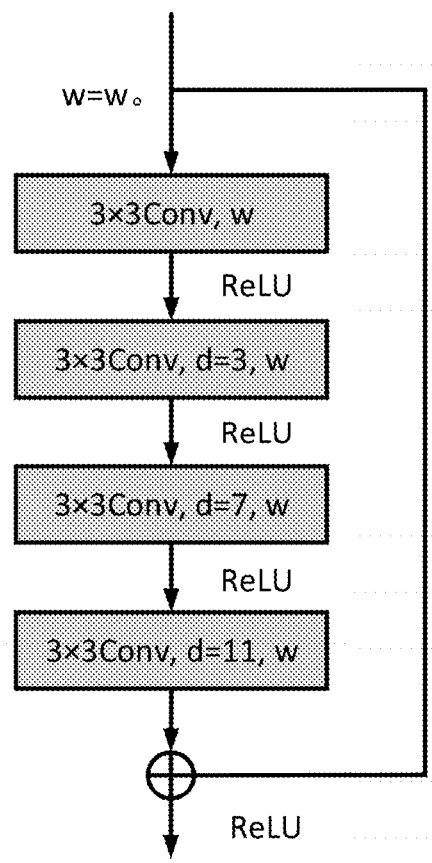
FIG. 7 is a diagram of a dilated convolution residual structure.

The residual module based on dilated convolution is proposed in the present disclosure, and as shown in FIG. 7, four layers of 3×3 convolution are adopted and have dilated rates fitted incrementally to enhance a long-distance information linkage of the drivable area segmentation task and the lane line detection task. In the present disclosure, three dilated convolution residual modules are used in an encoding network to enhance the receptive field of the model, which can improve detection precision of the network model and especially plays a great role in the detection of long-distance lane lines and drivable areas.

Step 5: drivable area segmentation and lane line detection are performed.

The decoder part includes a drivable area segmentation head and a lane line detection segmentation head, and the two segmentation heads have a same network structure. In the present disclosure, a bottom layer of the dilated convolution residual module is fed into two segmentation branches and has a size of (W/8, H/8, 256). After three times of upsampling, the feature map output from the neck network is restored to a size of (W, H, 2) in the present disclosure. In order to save a computational cost, a nearest interpolation method is used in an upsampling layer in the present disclosure, instead of conventional deconvolution.

Step 6: features are shared.

Figure 8:
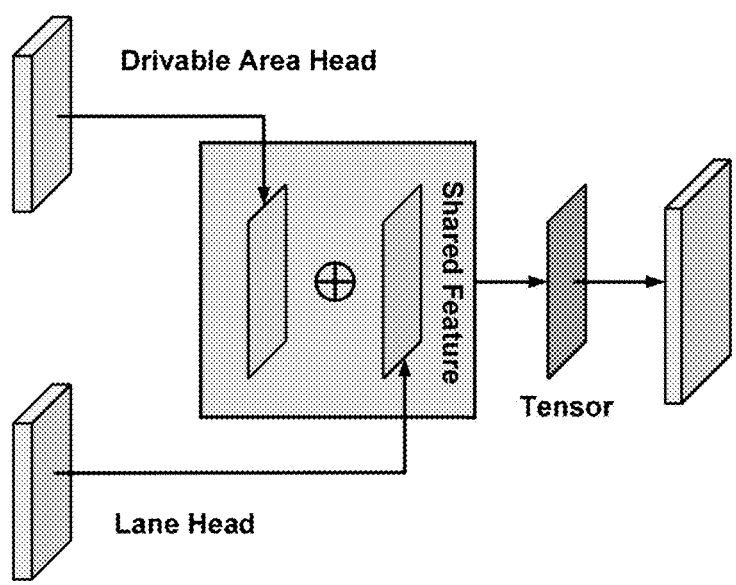
FIG. 8 is a structural diagram of a feature sharing module.

Furthermore, a feature sharing stage is further designed in the present disclosure, and FIG. 8 shows a schematic operation diagram of a feature sharing module. In the present disclosure, an Add operation is performed on a feature map obtained by first upsampling of the drivable area segmentation head and a feature map obtained by first upsampling of a lane line detection head, and then, the feature map obtained after the Add operation is input into the lane line detection head for second upsampling. The following formula explains the Add operation.

$$Z_{add} = \sum_{i=1}^{c}(X_i + Y_i) \times K_i \quad \#(2)$$

where X and Y represent channels, i represents an ith channel, a number of the channels is c, and K represents a weight of the corresponding channel.

Since the drivable area and the lane line are mutually blended targets, feature information of the drivable area segmentation part may be shared by the feature sharing module into the lane line detection task, such that beneficial information is provided for lane line detection, thereby improving precision of lane line detection.

Step 7: model training and loss function setting are performed.

Since two decoders are arranged in the network in the present disclosure, multi-task losses include a drivable area segmentation loss $\ell_{da\text{-}seg}$ and a lane line segmentation loss $\ell_{ll\text{-}seg}$, and each of the two losses includes a cross entropy Logits $\ell_{ce}$ loss which aims to minimize class errors between pixels and targets output by the network model. An IoU loss is added in the lane line loss in the present disclosure:

$$\ell_{IoU} = \frac{TP}{TP + FP + FN}$$

where TP represents a positive sample predicted to belong to a positive class by the model, FP represents a negative sample predicted to belong to the positive class by the model, and FN represents a positive sample predicted to belong to a negative class by the model.

$\ell_{da\text{-}seg}$ and $\ell_{ll\text{-}seg}$ are defined as:

$$\ell_{da-seg} = \ell_{ce} \quad \#(4)$$

$$\ell_{ll-seg} = \ell_{ce} + \ell_{IoU} \quad \#(5)$$

In summary, a final loss of the present disclosure is obtained by weighting the two parts, as shown in the following equation.

$$\ell_{all} = \gamma_1 \ell_{da-seg} + \gamma_2 \ell_{ll-seg} \quad \#(6)$$

where $\gamma_1$ and $\gamma_2$ are adjustment factors used to balance all parts of the total loss.

Since the model according to the present disclosure is a multi-task joint detection network, in the present disclosure, different training manners are tried to train the model according to the present disclosure in the training process. An end-to-end training manner is simplest, but wastes calculation and training time, and therefore, in order to compress the training time and optimize parameters, a brand-new alternating optimization algorithm is designed in the present disclosure to gradually train the model according to the present disclosure. In each step, the model may focus on one or more relevant tasks and does not consider irrelevant tasks. As shown in table 1, a training strategy in the present disclosure is specifically as follows: firstly, an encoder and the drivable area segmentation head are trained; secondly, a training weight of the drivable area segmentation head is frozen, and the lane line detection segmentation head is unlocked; thirdly, the encoder and the lane line detection segmentation head are trained; fourthly, training is jointly performed for the drivable area segmentation head and the lane line detection segmentation head; and fifthly, the above training steps are repeated until an effect is optimal.

TABLE 1

Algorithm 1 RSI-Net training stage. First, we only train Encoder and Drivable Area Segmentation Head. Second, we freeze the Encoder, Drivable Area Segmentation Head and unfreeze parameters from Lane Line Segmentation Head. Finally, the final network is trained jointly for drivable area segmentation and lane line segmentation tasks.

Input: Target end-to-end network Γ with parameter group
        ϑ={ θ$_{enc}$, θ$_{dri}$, θ$_{lan}$} ;
        Training dataset Λ ;
        Threshold for convergence η;
        Total loss function l$_{all}$;
        Pivot strategy P ={{θ$_{enc}$, θ$_{dri}$}, {θ$_{lan}$}, {θ$_{enc}$, θ$_{dri}$, θ$_{lan}$}}
Output: Proposed network: Γ(α; ϑ)
1:    procedure TRAIN (Γ, Λ)
2:        for i=0 to length(P)−1 // Freeze different parameters
3:            ϑ∩P[i] → ϑ
4:            repeat
5:                Sample a mini-batch (α$_o$, β$_o$) from training dataset Λ
6:                l$_{all}$(Γ(α$_o$; ϑ), β$_o$) → l
7:                arg min$_ϑ$ l → ϑ
8:            until l<η
9:            if i<length(P)−1 then
10:               ϑ∩P[i+1] → ϑ
11:           endif
12:       end for
13:    end procedure
14:    TRAIN (Γ, Λ)
15:    return Proposed network: Γ(α; ϑ)

The series of detailed descriptions listed above are only specific descriptions for the feasible embodiments of the present disclosure, and are not intended to limit the protection scope of the present disclosure, and all equivalent embodiments or modifications made without departing from the technology of the present disclosure shall be included within the protection scope of the present disclosure.

What is claimed is:

1. A multi-task joint perception method implementing a network model-for traffic road surface data, comprising:
preprocessing an input two-dimensional image to change a luminosity and a geometric shape of the image through data enhancement in a preprocessing process, by specific operations of adjusting a tone and saturation of the image and randomly rotating, zooming, translating, cutting, and overturning the image, to obtain a preprocessed image;
slicing the preprocessed image to obtain a sliced image, wherein information of H and W dimensions in the preprocessed image is concentrated into a channel space, such that the preprocessed image becomes a double downsampled image without an information loss, and then, the sliced image is transmitted;
downsampling the sliced image three times to extract image features;
receiving the image features to fuse the image features;
enhancing a receptive field of the model;
upsampling the fused image features three times, to obtain a restored image having an original size of the input two-dimensional image; and
performing an Add operation on a feature map obtained by first upsampling of the fused image features in a drivable area segmentation head and a feature map obtained by first upsampling of the fused image features in a lane line detection head, and input a feature map obtained after the Add operation into the lane line detection head for second upsampling.

2. The multi-task joint perception method according to claim 1, wherein CSPDarkNet53 is adopted to perform the downsampling the sliced image three times and wherein the CSPDarkNet53 aggregates a convolved feature map into two independent direction perception feature mappings along a vertical direction and a horizontal direction respectively, the two feature mappings with embedded direction specific information are then encoded into two attention mappings respectively, and each of the attention mappings captures a long-distance dependency relationship of the input feature map along one spatial direction.

3. The multi-task joint perception method according to claim 1, wherein a feature pyramid network (FPN) is adopted for implementing the receiving the image features to fuse the image features.

4. The multi-task joint perception method according to claim 1, wherein four layers of 3×3 convolution are adopted for implementing the enhancing the receptive field of the model and have dilated rates fitted incrementally to enhance a long-distance information linkage of a drivable area segmentation task and a lane line detection task.

5. The multi-task joint perception network method according to claim 1, wherein loss functions of the model comprise a drivable area segmentation loss function $\ell_{da-seg}$ and a lane line segmentation loss function $\ell_{ll-seg}$, each of the two loss functions comprises a loss function of a cross entropy Logits $\ell_{ce}$, and an IoU loss is added in the lane line loss function:

$$\ell_{IoU} = \frac{TP}{TP+FP+FN},$$

$\ell_{da\text{-}seg}$ and $\ell_{ll\text{-}seg}$ are designed as:

$$\ell_{da-seg} = \ell_{ce} \#(4)$$

$$\ell_{ll-seg} = \ell_{ce} + \ell_{IoU} \#(5)$$

a final loss function of the model is a weighted sum of the two loss functions:

$$\ell_{all} = \gamma_1 \ell_{da-seg} + \gamma_2 \ell_{ll-seg} \#(6)$$

wherein $\gamma_1$ and $\gamma_2$ are adjustment factors;
the model is trained through an alternating optimization algorithm which specifically comprises:
firstly, training an encoder and a drivable area segmentation head;
secondly, freezing a training weight of the drivable area segmentation head, and unlocking a lane line detection segmentation head;
thirdly, training the encoder and the lane line detection segmentation head;
fourthly, jointly performing training for the drivable area segmentation head and the lane line detection segmentation head; and
fifthly, repeating the above training steps until an effect is optimal.

6. A multi-task detection method for traffic road surface information, comprising:
S1: preprocessing a first image, to obtain a preprocessed image;
S2: slicing the preprocessed image, to obtain a sliced image;
S3: performing feature extraction integrating a coordinate attention mechanism on the sliced image from the S2, to obtain extracted features;
S4: fusing the extracted features and enhancing a receptive field;
S5: performing drivable area segmentation and lane line detection on fused features, and upsampling receptive-field-enhanced features three times, to obtain a restored image having an original size of the first image; and
S6: performing feature sharing on a feature map obtained in the S5: performing an Add operation on a feature map obtained by first upsampling of the fused features by the drivable area segmentation and a feature map obtained by first upsampling of the fused features by the lane line detection, and then inputting a feature map obtained after the Add operation into a lane line detection branch for second upsampling of the fused features.

7. The multi-task detection method for traffic road surface information according to claim 6, wherein the preprocessing of the S1 comprises: adjusting sizes of the image and a label that are input, adjusting a tone and saturation of the image, randomly rotating, zooming, translating, cutting, and overturning the image, and performing normalization and boundary zero filling to obtain a three-channel digital image.

8. The multi-task detection method for traffic road surface information according to claim 6, wherein the slicing of the S2 means that one value is obtained every other pixel in one image, wherein four images are obtained from one image, information of W and H dimensions is concentrated into a channel space, an input channel is expanded by a factor of three, and finally, a double downsampled image without an information loss is obtained.

9. The multi-task detection method for traffic road surface information according to claim 6, wherein the feature extraction of the S3 comprises: extracting image features using CSPDarkNet53, and downsampling the sliced image three times; wherein the CSPDarkNet53 includes the coordinate attention mechanism, wherein the coordinate attention mechanism is based on two attention mechanisms: squeeze-and-excitation (SE) and CBAM, wherein, in the coordinate attention mechanism, two independent parallel 1D global pooling operations are used to aggregate input features into two separate direction perception feature mappings along a vertical direction and a horizontal direction respectively, the two feature mappings with embedded direction specific information are then encoded into two attention mappings respectively, each of the two attention mappings captures a long-distance dependency relationship of an input feature map along one spatial direction, position information is saved in the two attention mappings, and then, the two attention mappings are applied to a mapping of the input features by multiplication.

10. The multi-task detection method for traffic road surface information according to claim 6, wherein in S4, multi-scale feature information of the extracted features is fused, a dilated rate is introduced in a convolution process, a distance between points of a convolution kernel is controlled by setting a parameter value of the dilated rate, and when the dilated rate d is 1, dilated convolution of 3×3 is equivalent to standard convolution, and a single-layer receptive field only has a size of 3×3; when the dilated convolution d is 3, the single-layer receptive field is increased to 7×7; four layers of 3×3 convolution are adopted, the dilated rates of the four layers of convolution are fitted incrementally to enhance a long-distance information linkage of a drivable area segmentation task and a lane line detection task.

11. The multi-task joint perception method according to claim 2, wherein loss functions of the model comprise a drivable area segmentation loss function $\ell_{da\text{-}seg}$ and a lane line segmentation loss function $\ell_{ll\text{-}seg}$ each of the two loss functions comprises a loss function of a cross entropy Logits $\ell_{ce}$, and an IoU loss is added in the lane line loss function:

$$\ell_{IoU} = \frac{TP}{TP+FP+FN},$$

$\ell_{da\text{-}seg}$ and $\ell_{ll\text{-}seg}$ are designed as:

$$\ell_{da-seg} = \ell_{ce} \#(4)$$

$$\ell_{ll-seg} = \ell_{ce} + \ell_{IoU} \#(5)$$

a final loss function of the model is a weighted sum of the two loss functions:

$$\ell_{all} = \gamma_1 \ell_{da-seg} + \gamma_2 \ell_{ll-seg} \#(6)$$

wherein $\gamma_1$ and $\gamma_2$ are adjustment factors;
the model is trained through an alternating optimization algorithm which specifically comprises:
firstly, training an encoder and a drivable area segmentation head;
secondly, freezing a training weight of the drivable area segmentation head, and unlocking a lane line detection segmentation head;
thirdly, training the encoder and the lane line detection segmentation head;
fourthly, jointly performing training for the drivable area segmentation head and the lane line detection segmentation head; and
fifthly, repeating the above training steps until an effect is optimal.

12. The multi-task joint perception network method according to claim 3, wherein loss functions of the model comprise a drivable area segmentation loss function $\ell_{da\text{-}seg}$ and a lane line segmentation loss function $\ell_{ll\text{-}seg}$, each of the two loss functions comprises a loss function of a cross entropy Logits $\ell_{ce}$, and an IoU loss is added in the lane line loss function:

$$\ell_{IoU} = \frac{TP}{TP+FP+FN},$$

$\ell_{da\text{-}seg}$ and $\ell_{ll\text{-}seg}$ are designed as:

$$\ell_{da-seg} = \ell_{ce} \#(4)$$

$$\ell_{ll-seg} = \ell_{ce} + \ell_{IoU} \#(5)$$

a final loss function of the model is a weighted sum of the two loss functions:

$$\ell_{all} = \gamma_1 \ell_{da-seg} + \gamma_2 \ell_{ll-seg} \#(6)$$

wherein $\gamma_1$ and $\gamma_2$ are adjustment factors;
the model is trained through an alternating optimization algorithm which specifically comprises:
firstly, training an encoder and a drivable area segmentation head;
secondly, freezing a training weight of the drivable area segmentation head, and unlocking a lane line detection segmentation head;
thirdly, training the encoder and the lane line detection segmentation head;
fourthly, jointly performing training for the drivable area segmentation head and the lane line detection segmentation head; and
fifthly, repeating the above training steps until an effect is optimal.

13. The multi-task joint perception network method according to claim 4, wherein loss functions of the model comprise a drivable area segmentation loss function $\ell_{da\text{-}seg}$ and a lane line segmentation loss function $\ell_{ll\text{-}seg}$, each of the two loss functions comprises a loss function of a cross entropy Logits $\ell_{ce}$, and an IoU loss is added in the lane line loss function:

$$\ell_{IoU} = \frac{TP}{TP+FP+FN},$$

$\ell_{da\text{-}seg}$ are $\ell_{ll\text{-}seg}$ are designed as:

$$\ell_{da-seg} = \ell_{ce} \#(4)$$

$$\ell_{ll-seg} = \ell_{ce} + \ell_{IoU} \#(5)$$

a final loss function of the model is a weighted sum of the two loss functions:

$$\ell_{all} = \gamma_1 \ell_{da-seg} + \gamma_2 \ell_{ll-seg} \#(6)$$

wherein $\gamma_1$ and $\gamma_2$ are adjustment factors;
the model is trained through an alternating optimization algorithm which specifically comprises:
firstly, training an encoder and a drivable area segmentation head;
secondly, freezing a training weight of the drivable area segmentation head, and unlocking a lane line detection segmentation head;
thirdly, training the encoder and the lane line detection segmentation head;
fourthly, jointly performing training for the drivable area segmentation head and the lane line detection segmentation head; and
fifthly, repeating the above training steps until an effect is optimal.

* * * * *